US009094461B2

(12) United States Patent
Wu (10) Patent No.: US 9,094,461 B2
(45) Date of Patent: Jul. 28, 2015

(54) FILTERING A STREAM OF CONTENT (71) Applicant: Google Inc., Mountain View, CA (US)

(72) Inventor: Vincent Wu, Belmont, CA (US)

(73) Assignee: Google Inc., Mountain View, CA (US)

( * ) Notice: Subject to any disclaimer, the term of this patent is extended or adjusted under 35 U.S.C. 154(b) by 167 days.

(21) Appl. No.: 13/655,566

(22) Filed: Oct. 19, 2012

(65) Prior Publication Data
US 2014/0115181 A1 Apr. 24, 2014

(51) Int. Cl.
G06F 15/16 (2006.01)
G06F 13/00 (2006.01)
G06Q 10/00 (2012.01)
G06F 3/00 (2006.01)
H04L 29/08 (2006.01)
G06F 17/30 (2006.01)
H04W 4/20 (2009.01)

(52) U.S. Cl.
CPC .......... H04L 67/22 (2013.01); G06F 17/30867 (2013.01); H04W 4/206 (2013.01)

(58) Field of Classification Search
USPC .......................................................... 709/205
See application file for complete search history.

(56) References Cited

U.S. PATENT DOCUMENTS 7,191,462 B1 * 3/2007 Roman et al. .................... 725/98
7,849,440 B1 * 12/2010 Englehart ...................... 717/106
2002/0133821 A1 9/2002 Shteyn
2003/0028871 A1 2/2003 Wang et al.
2003/0093792 A1 * 5/2003 Labeeb et al. ................... 725/46
2005/0235307 A1 10/2005 Relan et al.
2008/0010653 A1 * 1/2008 Ollikainen et al. ............. 725/25
2008/0301232 A1 * 12/2008 Facemire et al. ............. 709/205
2009/0119173 A1 * 5/2009 Parsons et al. ................. 705/14
2010/0070485 A1 * 3/2010 Parsons et al. ................ 707/709
2010/0251280 A1 9/2010 Sofos et al.
2012/0158461 A1 * 6/2012 Aldrey et al. ................ 705/7.35
2012/0159337 A1 * 6/2012 Travilla et al. ................ 715/738
2012/0243850 A1 9/2012 Basra et al.
2013/0151269 A1 * 6/2013 Chaffee et al. .................... 705/2
2013/0271381 A1 * 10/2013 Lazaridis ....................... 345/171
2013/0283319 A1 * 10/2013 Marshall et al. ................ 725/61
2014/0040372 A1 * 2/2014 Kamimaeda et al. ......... 709/204

OTHER PUBLICATIONS

International Search Report and Written Opinion for PCT/US2013/065595, mailed Jan. 16, 2015, 11 pages.

* cited by examiner

Primary Examiner — Emanuel L Moise
Assistant Examiner — Mahran Abu Roumi
(74) Attorney, Agent, or Firm — Patent Law Works LLP (57) ABSTRACT A system and method for filtering a stream of content based on the time available to a user is disclosed. A filter application includes a timing module, a determination module and a user interface engine. The timing module receives a request for a stream of content from a user. The determination module calculates a viewing time for each post in the stream of content and determines one or more posts from the stream of content based on the viewing time of each post and an available time for the user. The user interface engine provides the one or more posts to the user.

18 Claims, 6 Drawing Sheets

FILTERING A STREAM OF CONTENT

BACKGROUND

The disclosure relates to filtering a stream of content based on the time available to a user.

Consumers of digital media may have goals of keeping apprised of information in areas that they find interesting. Keeping apprised of information can become burdensome in the digital age because of the amount of available information and the lack of time for the consumers to view all of the available information. In addition, current services that provide the information to the consumers often provide content that has already been viewed by the consumers.

SUMMARY

According to one innovative aspect of the subject matter described in this disclosure, a timing module receives a request for a stream of content from a user and determines an available time for the user, a determination module calculates a viewing time for each post in the stream of content and determines one or more posts from the stream of content based on the available time for the user, and a user interface engine provides the one or more posts to the user.

In general, another innovative aspect of the subject matter described in this disclosure may be embodied in methods that include receiving a request for a stream of content from a user, calculating a viewing time for each post in the stream of content, determining an available time for the user, determining one or more posts from the stream of content based on the available time for the user and providing the one or more posts to the user.

Other implementations of one or more of these aspects include corresponding systems, apparatus, and computer programs, configured to perform the actions of the methods, encoded on computer storage devices.

These and other implementations may each optionally include one or more of the following features. For instance, the operations further include determining a behavior pattern of the user based on previously submitted requests and determining the available time based on the behavior pattern of the user, determining the behavior pattern of the user based on timing information associated with the previously submitted requests, determining the behavior pattern of the user based on location information associated with the previously submitted requests, determining a format preferred by the user for the one or more posts and determining the viewing time of each post based on the format, determining the one or more posts from the stream of content based on a list of posts previously viewed by the user and receiving a time frame for the stream of content from the user and determining the one or more posts from the stream of content based on the time frame.

The specification describes a filter application that advantageously filters a stream of content requested by a user by determining and providing one or more posts based on the time available to a user. The filter application also automatically determines the time available to the user for viewing the stream of content based on a behavior pattern of the user. Additionally, the filter application determines the one or more posts based on posts that were previously viewed by the user.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

A system and method for filtering a stream of content based on the time available to a user is described below.

Figure 1:
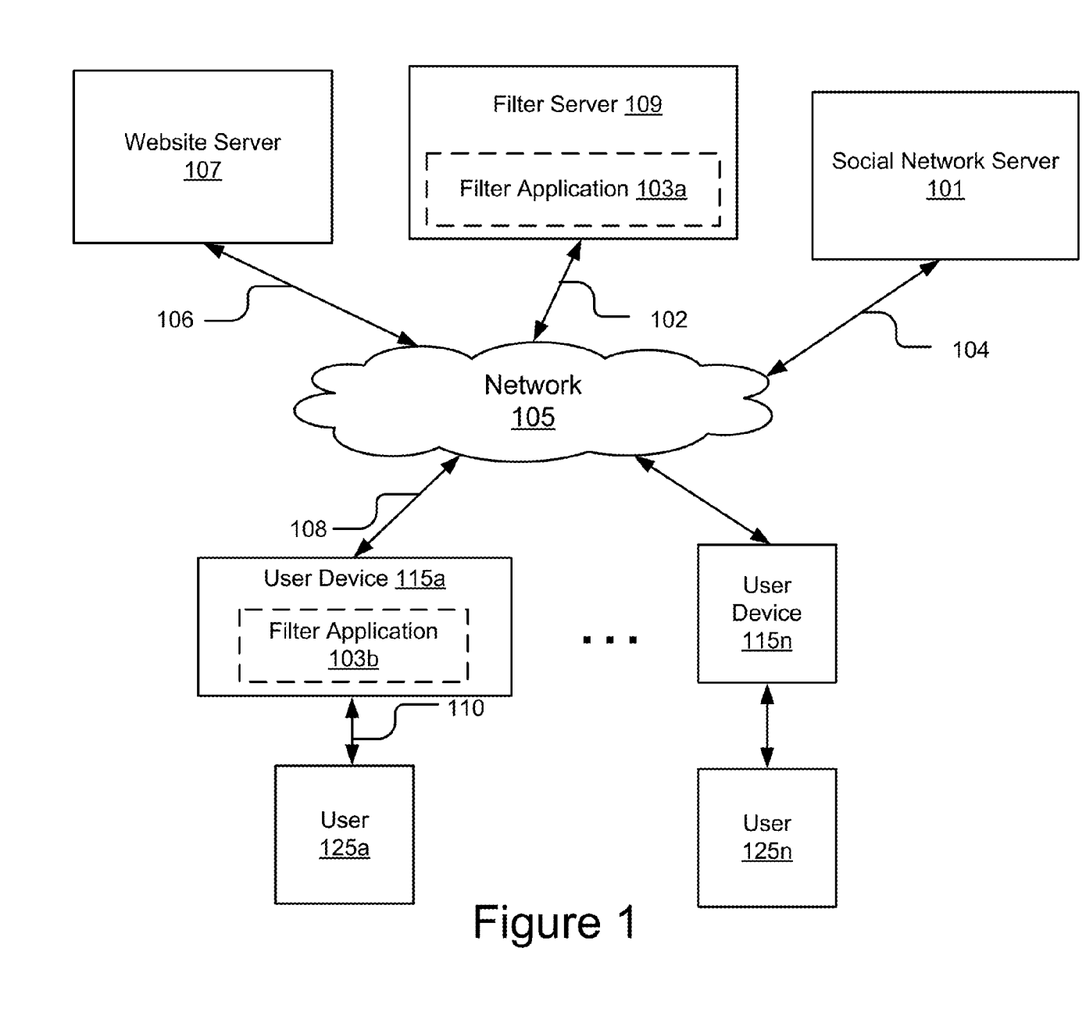
FIG. 1 is a block diagram illustrating an example system for filtering a stream of content based on the time available to a user.

FIG. 1 illustrates a block diagram of a system 100 for filtering a stream of content based on the time available to a user. The illustrated description of the system 100 includes user devices 115a . . . 115n that are accessed by users 125a . . . 125n, a social network server 101, a website server 107 and a filter server 109. In the illustrated implementation, these entities of the system 100 are communicatively coupled via a network 105. In FIG. 1 and the remaining figures, a letter after a reference number, for example "115a" is a reference to the element having that particular reference number. A reference number in the text without a following letter, for example "115," is a general reference to any or all instances of the element bearing that reference number.

The network 105 may be a conventional type network, wired or wireless, and may have any number of configurations for example a star configuration, token ring configuration or other configurations. Furthermore, the network 105 may comprise a local area network (LAN), a wide area network (WAN) (e.g., the Internet), and/or any other interconnected data path across which multiple devices may communicate. In some instances, the network 105 may be a peer-to-peer network. The network 105 may also be coupled to or includes portions of a telecommunications network for sending data in a variety of different communication protocols. In some other instances, the network 105 includes Bluetooth communication networks or a cellular communications network for sending and receiving data for example via SMS/MMS, hypertext transfer protocol (HTTP), direct data connection, WAP, e-mail, etc. While only one network 105 is illustrated, any number of networks may be coupled to the above mentioned entities.

In some instances, a filter application 103a may be operable on the filter server 109, which is coupled to the network 105 via signal line 102. The filter server 109 can be a hardware server that includes a processor, a memory and network communication capabilities. The filter server 109 sends and receives data to and from one or more of the user devices 115a, 115n, the website server 107 and the social network server 101 via the network 105. For example, the filter server 109 receives a request for a stream of content submitted by a user 125a from the user device 115a. The filter server 109 provides a stream of content to the user device 115a. In this example, the stream of content provided by the filter server 109 includes one or more posts received from the social network server 101 and/or the website server 107.

In some instances, a filter application 103b may be operable on a user device 115a, which is coupled to the network 105 via signal line 108. In some instances, the user device 115*a*, 115*n* may be a computing device that includes a memory and a processor, for example, a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105. For example, a mobile device includes a processor for executing the filter application 103*b* that is stored in a memory of the mobile device. In another example, the filter application 103 can be a thin-client application that includes part of the filter application 103*b* on the user device 115*a* and part of the filter application 103*a* on the filter server 109 for filtering a stream of content for the user 125*a*. In the illustrated instance, the user 125*a* interacts with the user device 115*a* via signal line 110.

The filter application 103 can receive data for generating a stream of content from heterogeneous data sources. In some instances, the filter application 103 can receive data from the social network server 101 and/or the website server 107.

The social network server 101 can be a hardware server that includes a processor, a memory and network communication capabilities. The social network server 101 is coupled to the network 105 via signal line 104. The social network server 101 also includes a social network application (not pictured) that can be part of the filter application 103 or a standalone application. A social network generates a social graph that can include explicitly defined relationships and relationships implied by social connections with other online users, where the relationships form a social graph. In some instances, the social graph can reflect a mapping of these users and how they are related. Furthermore, it should be understood that the social network server 101 may be representative of one social network and that there may be multiple social networks coupled to the network 105, each having its own server, application and social graph. For example, a first social network may be directed to business networking, a second may be directed to or centered on academics, a third may be directed to local business, a fourth is directed to dating and others are of general interest or a specific focus.

The social network application may manage the social network by handling account registration, publication of content (e.g., posts, comments, photos, links, check-ins), managing of groups, managing different sharing and visibility levels, updating the social graph. For example, the social network application registers the user 125 by receiving information (e.g., a username and password) and generates a user profile that is associated with the user 125. In some instances, the user profile includes additional information about the user 125 including interests (e.g., soccer, reading, food), activities (e.g., search history, indications of acknowledgement, shared posts, unique posts, comments) and demographics (e.g., age, ethnicity, location).

The social network server 101 may send and receive data to and from one or more of the user devices 115*a*, 115*n* and/or the filter server 109 via the network 105. In some instances, the social network application sends social network content to the filter server 109. The social network content includes, for example, a description of activities performed by the user 125 and the user's friends, conversations, events, status updates, comments, photos, etc.

The website server 107 can be any computing device (e.g., a hardware server) including a processor, a memory and network communication capabilities. The website server 107 is communicatively coupled to the network 105 via signal line 106. The website server 107 includes instructions and/or data for providing online services and providing one or more service updates from the online services to a user 125 who has a subscription with the online services. The online services may include services for generating current news, financial news, sharing images, searching, sharing videos, maps, aggregating prices, weather, airline reservations, file archives, electronic messaging, blogs, calendars, geolocation, etc. In some instances, the website server 107 sends and receives data (e.g., news articles, weather updates, blog updates) to and from one or more of the user devices 115 and/or the filter server 109.

Figure 2:
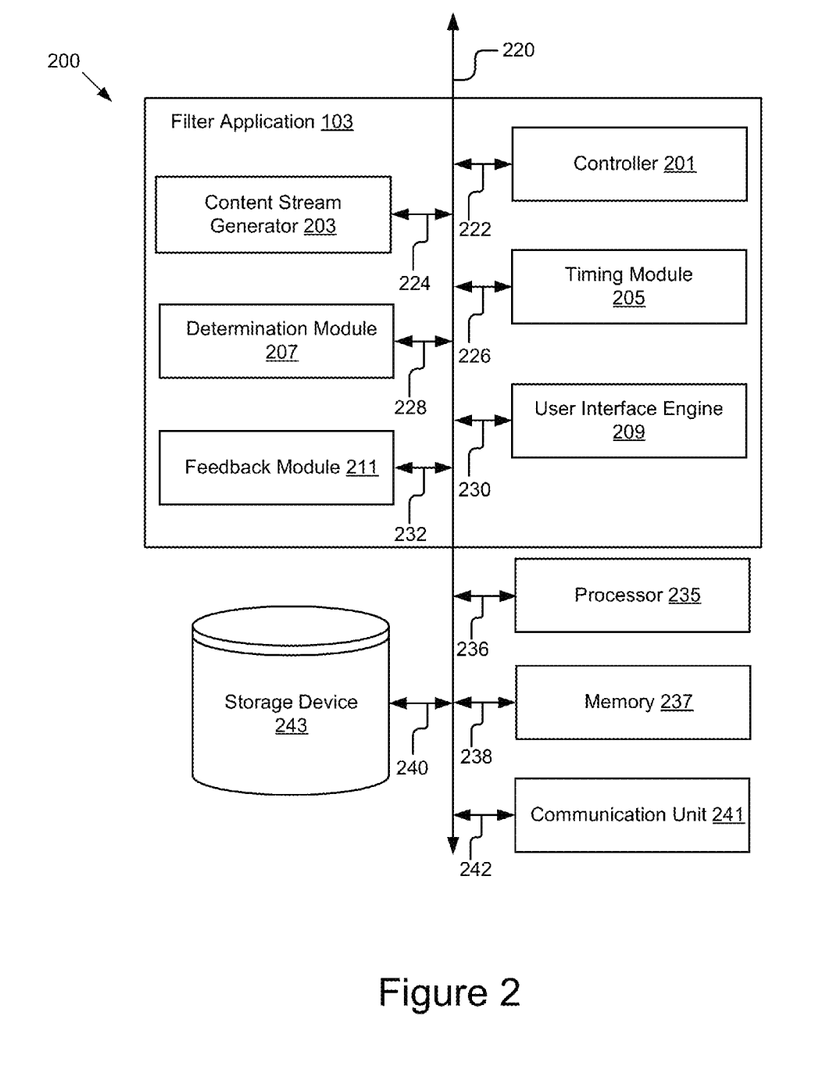
FIG. 2 is a block diagram illustrating an example filter application.

Referring now to FIG. 2, an example of a filter application 103 is shown in more detail. FIG. 2 is a block diagram of a computing device 200 that includes the filter application 103, a processor 235, a memory 237, a communication unit 241 and a storage device 243 according to some implementations. The components of the computing device 200 are communicatively coupled by a bus 220. Optionally, the computing device 200 can be the filter server 109. In some instances, the computing device 200 may be a user device 115*a*.

The processor 235 includes an arithmetic logic unit, a microprocessor, a general-purpose controller or some other processor array to perform computations and provide electronic display signals to a display device. The processor 235 is coupled to the bus 220 via signal line 236 for communication with the other components. Processor 235 may process data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. Other processors, operating systems, sensors, displays and physical configurations are possible.

The memory 237 stores instructions and/or data that may be executed by processor 235. The memory 237 is coupled to the bus 220 via signal line 238 for communication with the other components. The instructions and/or data may include code for performing any and/or all of the techniques described herein. The memory 237 may be a dynamic random access memory (DRAM) device, a static random access memory (SRAM) device, flash memory or some other memory device. In some instances, the memory 237 also includes a non-volatile memory or similar permanent storage device and media for example a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from at least one of the user device 115, the filter server 109, the social network server 101 and website server 107 depending upon where the filter application 103 is stored. The communication unit 241 is coupled to the bus 220 via signal line 242. In some instances, the communication unit 241 includes a port for direct physical connection to the network 105 or to another communication channel. For example, the communication unit 241 includes a USB, SD, CAT-5 or similar port for wired communication with the user device 115. In some other instances, the communication unit 241 includes a wireless transceiver for exchanging data with the user device 115 or any other communication channel using one or more wireless communication methods, e.g., IEEE 802.11, IEEE 802.16, BLUETOOTH® or another suitable wireless communication method.

In some instances, the communication unit 241 includes a cellular communications transceiver for sending and receiving data over a cellular communications network, e.g., via short messaging service (SMS), multimedia messaging service (MMS), hypertext transfer protocol (HTTP), direct data connection, WAP, e-mail or another suitable type of electronic communication. In some other instances, the communication unit 241 includes a wired port and a wireless transceiver. The communication unit 241 also provides other conventional connections to the network for distribution of files and/or media objects using standard network protocols, e.g., TCP/IP, HTTP, HTTPS and SMTP.

The storage device 243 can be a non-transitory memory that stores data for the functionality of the filter application 103. In some instances, the data is stored temporarily, for example, a cache. The storage device 243 may be a dynamic random access memory (DRAM) device, a static random access memory (SRAM) device, flash memory or some other memory device. In some instances, the storage device 243 also includes a non-volatile memory or similar permanent storage device and media, e.g., a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 243 is communicatively coupled to the bus 220 for communication with the other components of the computing device 200 via signal line 240. Although only one storage device is shown in FIG. 2, multiple storage devices may be included. In some other instances, the storage device 243 may not be included in the computing device 200 and can be communicatively coupled to the computing device 200 via the network 105. In some instances, the data stored in the storage device 243 includes user profiles including streams of content, previously submitted requests, previously viewed posts, etc.

In some instances, the filter application 103 includes a controller 201, a content stream generator 203, a timing module 205, a determination module 207, a user interface engine 209 and a feedback module 211 that are each coupled to the bus 220.

The controller 201 can be code and routines for handling communications between the components of the filter application 103 and other components of the system 100. In some instances, the controller 201 can be a set of instructions executable by the processor 235 to provide the functionality described below for handling communications between the components of the filter application 103 and other components of the system 100. In some instances, the controller 201 is stored in the memory 237 of the computing device 200 and can be accessible and executable by the processor 235. In either of the instances, the controller 201 may be adapted for cooperation and communication with the processor 235 and other components of the computing device 200 via signal line 222.

In some instances, the controller 201 receives information via the communication unit 241. The controller 201 then sends the received information to other components of the filter application 103 based on the type of the received information. For example, the controller 201 receives posts (e.g., status updates, comments, blog entries, news articles, photos, videos) from the social network server 101 and/or the website server 107. The controller 201 transmits the posts to the content stream generator 203. In another example, the controller 201 receives a request for a stream of content from the user device 115. The controller 201 transmits the request to the timing module 205. In yet another example, the controller 201 receives user engagement data from the user device 115 and transmits the user engagement data to the feedback module 211.

In some instances, the controller 201 receives information from other components of the filter application 103 and transmits the information to other components of the system 100. For example, the controller 201 receives graphical data for displaying one or more posts from the user interface engine 209. The controller 201 transmits the graphical data to the user device 115 via the communication unit 241.

In some instances, the controller 201 handles the communication between other modules/engines 203, 205, 207, 209 and 211 in the filter application 103. For example, the controller 201 communicates with the timing module 205 and the determination module 207 to send the output of the timing module 205 (e.g., available time) to the determination module 207. However, this description may occasionally omit the mention of the controller 201 for purposes of clarity and convenience. For example, for purposes of clarity and convenience, the above scenario may be described as the timing module 205 sending the available time to the determination module 207.

The content stream generator 203 can be code and routines for registering a user 125 with the filter application 103 and generating a stream of content for the user 125. In some instances, the content stream generator 203 can be a set of instructions executable by the processor 235 to provide the functionality described below for registering a user 125 with the filter application 103 and generating a stream of content for the user 125. In some other instances, the content stream generator 203 can be stored in the memory 237 of the computing device 200 and can be accessible and executable by the processor 235. In either of the instances, the content stream generator 203 can be adapted for cooperation and communication with the processor 235, the storage device 243, the controller 201 and other components of the filter application 103 via signal line 224.

In some instances, the content stream generator 203 receives requests submitted by a user 125 to be registered with the filter application 103. The content stream generator 203 then registers the user 125 using information included in the request (e.g., username, password, user interests). In some instances, the content stream generator 203 generates a user profile comprising the information included in the request and stores the user profile in the storage device 243.

In some instances, the content stream generator 203 receives posts from the social network server 101 and/or the website server 107. For example, the content stream generator 203 receives social network content (e.g., status updates, comments, photos, videos, events) from the social network server 101. In another example, the content stream generator 203 receives news articles, weather updates, stock market updates, blog updates, etc. from the website server 107. The content stream generator 203 then generates a stream of content for each registered user from the received posts. In some instances, the content stream generator 203 generates a stream of content based on the interests of the user 125. For example, if a user 125 is interested in golf, the content stream of generator 203 includes posts related to golf (e.g., news articles regarding a current golf championship, status updates from a golf player's social network profile). The content stream generator 203 then indexes the generated stream of content in the user profile of the user 125.

In some instances, the content stream generator 203 receives content that includes metadata categorizing the content. The content stream generator 203 extracts the metadata and organizes the content according to topics. This avoids the user from having to view the same type of information multiple times. For example, if the content stream generator 203 receives an article published by Newspaper A about contaminated avocadoes from the website server 107 and a user that shared a similar article about contaminated avocadoes published by Newspaper B from the social network server 101, the content stream generator 203 categorizes both articles as being about avocados so that the determination module 207 only selects one of the articles for display to the user 125. In some instances, the content stream generator 203 selects the article based on prior user behavior, for example, whether the user prefers viewing newspaper articles directly or whether the user is more likely to consume content linked to by people that have a high social affinity with the user. In some instances, the content stream generator 203 provides a stream of content for a topic selected by the user. For example, the user requests a stream of political content.

In some instances, the content stream generator 203 receives the content without categories. The content stream generator 203 applies topics to the content, for example, by extracting words from prominent positions in the content including headers and tags. The content stream generator 203 categorizes the content based on the topics and transmits the categorized content to the determination module 207.

The timing module 205 can be code and routines for receiving a request for a stream of content from a user 125 and determining an available time for the user 125. In some instances, the timing module 205 can be a set of instructions executable by the processor 235 to provide the functionality described below for receiving a request for a stream of content from a user 125 and determining an available time for the user 125. In some other instances, the timing module 205 can be stored in the memory 237 of the computing device 200 and can be accessible and executable by the processor 235. In either of the instances, the timing module 205 can be adapted for cooperation and communication with the processor 235, the controller 201, the determination module 207 and other components of the filter application 103 via signal line 226.

The timing module 205 may receive a request for a stream of content submitted by a user 125 from the controller 201. In some instances, the request for the stream of content includes an available time for the user 125 to view the stream of content. In the instance where the user consents to the use of such data, the timing module 205 determines the available time based on a behavioral pattern of the user 125. In these instances, the timing module 205 determines the behavioral pattern of the user 125 based on contextual information (e.g., time, location) associated with previous requests for the stream of content submitted by the user 125.

For example, a user 125 that consented to the use of data to determine behavioral patterns has previously requested a stream of content on every weekday at 8:00 a.m. (e.g., while having breakfast) and views the posts of the stream of content until 8:30 a.m. In this example, if the timing module 205 receives a request for a stream of content from the user 125 at 8:00 a.m. on a weekday, the timing module 205 infers that the available time for the user 125 is 30 minutes. In another example, a user 125 has previously requested a stream of content from a train station at 5:00 p.m. (e.g., while returning home from work) and views the posts for 45 minutes. In this example, if the timing module 205 receives a request for a stream of content submitted by the user 125 from the train station at 5:00 p.m., the timing module 205 infers that the available time is 45 minutes. Once the available time for the user 125 is determined, the timing module 205 sends the request and the available time to the determination module 207.

The determination module 207 can be code and routines for determining one or more posts to be provided to a user 125. In some instances, the determination module 207 can be a set of instructions executable by the processor 235 to provide the functionality described below for determining one or more posts to be provided to a user 125. In some other instances, the determination module 207 can be stored in the memory 237 of the computing device 200 and can be accessible and executable by the processor 235. In either of the instances, the determination module 207 can be adapted for cooperation and communication with the processor 235, the storage device 243, the timing module 205, the user interface engine 209 and other components of the filter application 103 via signal line 228.

The determination module 207 may receive a user's 125 request for a stream of content and an available time for the user 125 from the timing module 205. The determination module 207 then receives a stream of content directly from the content stream generator 203 or the determination module 207 retrieves a stream of content indexed with the user's 125 profile from the storage device 243. The determination module 207 then determines one or more posts from the stream of content based on the available time.

The determination module 207 calculates a viewing time for each post in the stream of content. A viewing time for a post may be the average time (e.g., arithmetic mean, geometric mean, median, mode) taken by users in general to view, peruse or interact with the post. In the instance where the user consents to the use of such data, the determination module 207 determines the time it takes the user 125 to view posts. For example, the determination module 207 calculates a viewing time of a video that is 15 minutes long as 15 minutes. In another example, the determination module 207 calculates the viewing time for a news article that is one page long as ten minutes. In this example, the determination module 207 calculates the viewing time based on, for example, the number of words/lines in the news article, additional website links present in the news article, etc. In yet another example, the determination module 207 calculates a viewing time for a status update received from a social network as 30 seconds. In this example, if the user 125 can interact with the content (for example, post a comment, provide an indication of acknowledgement, etc.), then the determination module 207 calculates the viewing time for the status update as two minutes. In some instances, the determination module 207 personalizes the viewing time based on the user's consumption of content as received from the feedback module 211. For example, in the instance where the user consents to the user of such data, the determination module 207 divides a number of words in articles that the user read by the time the user spent on the article. This way, the determination module 207 accounts for users that read every word carefully and users that prefer to skim through the content.

In these instances, the determination module 207 determines the one or more posts to be provided to the user 125 based on the topic of the content, the available time and the viewing time of each post in the stream of content. For example, if the available time is 30 minutes, the determination module 207 selects three news articles with different topics that have a viewing time of five minutes each, a social network status update that has a viewing time of one minute and a video of that has a viewing time of 14 minutes.

In the instance where the user consents to the use of such data, the determination module 207 determines the one or more posts based on a list of posts previously viewed by the user 125 as received from the feedback module 211. In these instances, in response to receiving a request, if a post has already been viewed by the user 125, the determination module 207 does not include the post in the one or more posts to be provided to the user 125. In some further instances, the determination module 207 also infers the topic of a post that has been previously viewed by the user 125. In these instances, the determination module 207 determines the one or more posts to be provided to the user 125 based on the topic. For example, the determination module 207 infers the topic of a weather update that was previously viewed by the user 125 as "hurricane" and "Louisiana." In this example, in response to receiving a request from the user 125, the determination module 207 does not select a news article categorized under the same topic (i.e., "hurricane" and "Louisiana") as a post to be provided to the user 125. In some instances, the determination module 207 also determines to provide certain topics that the user 125 views at certain times of the day. For example, the user 125 views content about current events in the morning, content about fashion in the middle of the day and content that includes photography at night.

In some instances, the determination module 207 receives a format that is preferred by the user from the feedback module 211 for displaying the posts. For example, the user 125 prefers to read the headlines or the user 125 prefers to read full articles. The determination module 207 uses the format to update the viewing time for each post because, for example, if all the posts are headlines the user 125 can read a lot more posts in the available time than if the user 125 prefers to read full articles. The determination module 207 also instructs the user interface engine 209 to configure display of the one or more posts according to the user's 125 preferred format.

In some instances, the user 125 requests for a stream of content including posts that occurred within a time frame (e.g., within the past three hours, 24 hours, one week, one month). In these instances, the determination module 207 determines the one or more posts based on the time frame included in the received request. Once the determination module 207 determines one or more posts to be provided to the user 125, the determination module 207 sends an instruction to the user interface engine 209.

The user interface engine 209 can be code and routines for generating graphical data for providing a user interface. In some instances, the user interface engine 209 can be a set of instructions executable by the processor 235 for generating graphical data for providing a user interface. In some other instances, the user interface engine 209 can be stored in the memory 237 of the computing device 200 and can be accessible and executable by the processor 235. In either of the instances, the user interface engine 209 can be adapted for cooperation and communication with the processor 235, the determination module 207 and other components of the filter application 103 via signal line 230.

The user interface engine 209 may receive an instruction from the determination module 207 including one or more posts to be provided to the user 125. The user interface engine 209 then generates graphical data for providing a user interface including the one or more posts. Once the user interface engine 209 generates the graphical data, the controller 201 transmits the graphical data to the user device 115 via the communication unit 241. The user device 115 renders the graphical data on a display device (not pictured). The user interfaces are explained further in detail below with reference to FIGS. 5A-B.

The feedback module 211 can be code and routines for receiving user engagement data and determining whether a user 125 viewed the one or more posts provided by the filter application 103. In some instances, the feedback module 211 can be a set of instructions executable by the processor 235 for receiving user engagement data and determining whether a user 125 viewed the one or more posts provided by the filter application 103. In some other instances, the feedback module 211 can be stored in the memory 237 of the computing device 200 and can be accessible and executable by the processor 235. In either of the instances, the feedback module 211 can be adapted for cooperation and communication with the processor 235, the storage device 243, the controller 201, the determination module 207 and other components of the filter application 103 via signal line 232.

In some instances, in response to providing a user interface including the one or more posts to the user 125, the feedback module 211 receives user engagement data from the user device 115. The user engagement data includes any data that describes a user's engagement with the one or more posts on a user device 115. The user engagement data includes, for example, user input, a duration of visibility of a post on the user device 115, etc.

In some instances, the feedback module 211 determines whether the user 125 viewed a post based on a user input received from the user device 115. The user input includes, for example, a comment in response to the post, an indication of acknowledgement of the content, sharing the content, etc. For example, in response to receiving the user interface including a post, the user 125 submits a comment. In this example, the feedback module 211 infers that the user 125 viewed the post before submitting the comment. These examples are useful for determining whether the user 125 viewed the content quickly or abandoned the content. For example, if the user 125 consistently spends ⅓ as much time reading content as the average but the user 125 comments on articles, shares posts in the social network, etc., the feedback module 211 determines that the user 125 takes less time to read content than the average user.

In the instance where the user consents to the use of such data, the feedback module 211 determines whether the user 125 viewed a post based on the duration of visibility of the post on the user device 115. In these instances, the feedback module 211 calculates a ratio between the duration of visibility of the post and the viewing time for the post. The feedback module 211 receives the viewing time for the post from the determination module 207. For example, a news article may be visible to a user 125 on the user device 115 for nine minutes. The viewing time for the news article (as calculated by the determination module 207) is ten minutes. In this example, the feedback module 211 determines that the post has been viewed by the user 125 because the ratio is 0.9. In another example, a video may be visible to the user 125 on the user device 115 for three minutes. The viewing time for the video is 15 minutes. In this example, the feedback module 211 determines that the user did not view the video completely as the ratio is 0.2.

Once the feedback module 211 determines that a post is viewed by the user 125, the feedback module 211 may include the post in a list of previously viewed posts that is indexed with the user's profile in the storage device 243.

In some instances, the feedback module 211 determines a format for displaying the one or more posts based on the user's 125 method of consumption. For example, the user's 125 tendency to spend substantially less than an average amount of time viewing a post could be indicative of a preference to only read headlines or a snippet of articles. Conversely, when a user 125 consistently clicks links to expand an excerpt or open a new webpage with the full article, the user 125 prefers to read the complete article. Based on this, the feedback module 211 transmits the consumption pattern to the determination module 207, which determines the one or more posts to provide based on the amount of content that the user 125 prefers to view.

Figure 3:
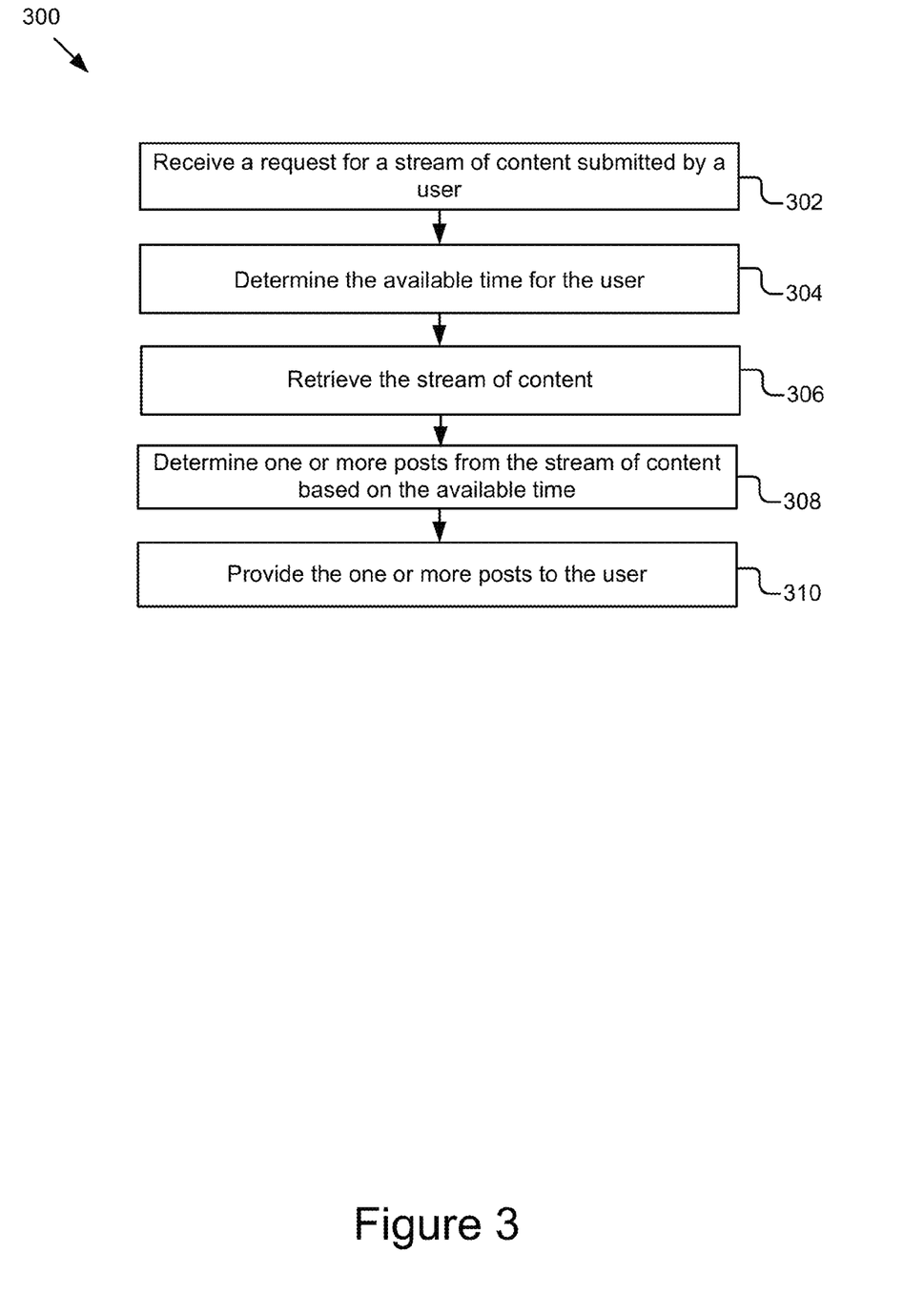
FIG. 3 is a flow diagram of an example method for filtering a stream of content based on the time available to a user.

FIG. 3 is a flow diagram 300 of an example of a method for filtering a stream of content based on the time available to a user 125. The controller 201 receives 302 a request for a stream of content submitted by a user 125. The timing module 205 determines 304 the available time for the user 125. For example, the timing module 205 determines the available time based on a behavioral pattern of the user 125. The determination module 207 retrieves 306 the stream of content, for example, from the storage device 243 or from the content stream generator 203. The determination module 207 determines 308 one or more posts from the stream of content based on the available time. The user interface engine 209 then provides 310 the one or more posts to the user 125.

Figure 4:
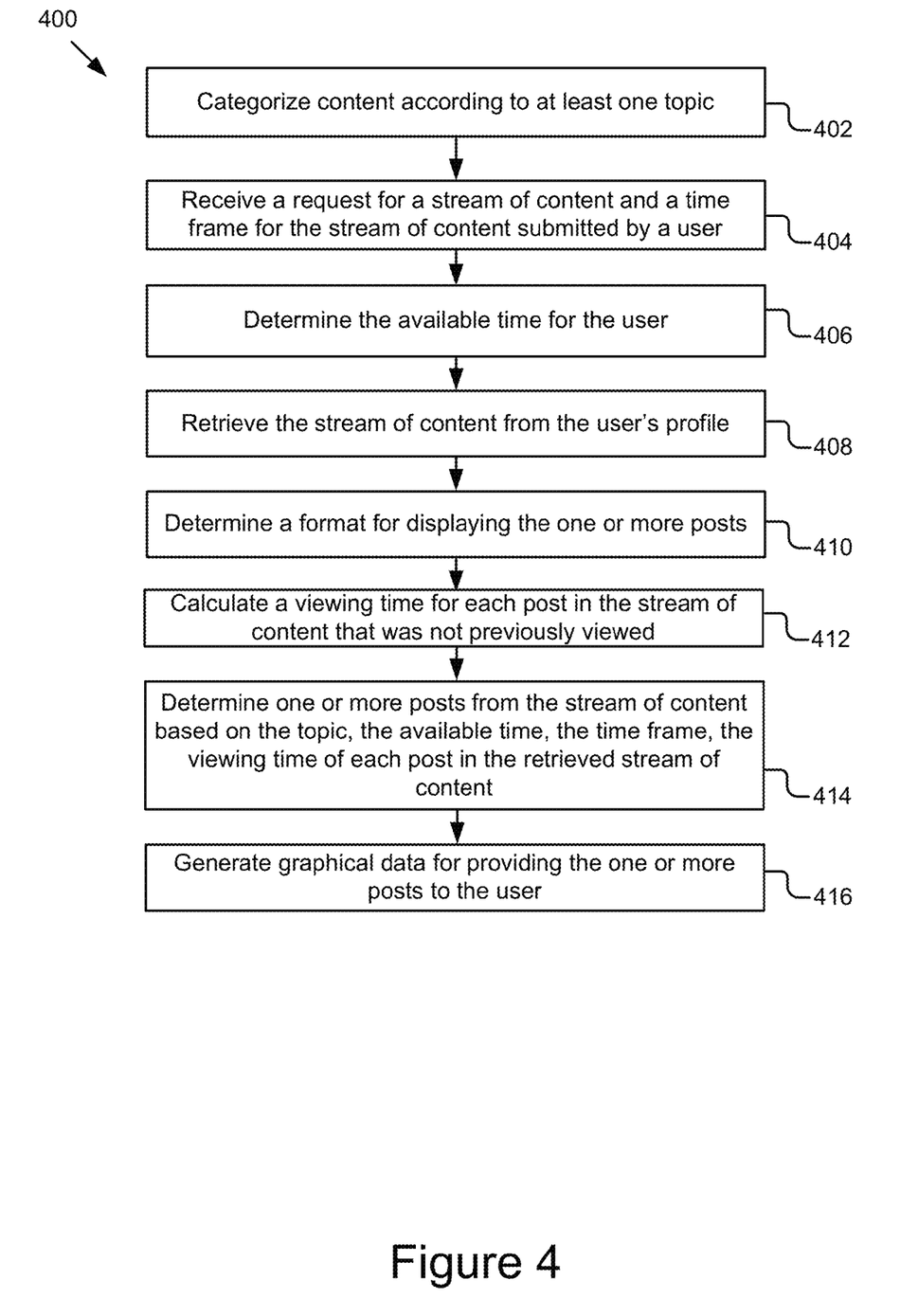
FIG. 4 is a flow diagram of another example method for filtering a stream of content based on the time available to a user.

FIG. 4 is a flow diagram 400 of another method for filtering a stream of content based on the time available to a user 125. The content stream generator 203 categorizes 402 the content according to at least one topic. The controller 201 receives 404 a request for a stream of content and a time frame for the stream of content submitted by a user 125. The timing module 205 determines 406 the available time for the user 125. For example, the timing module 205 determines the available time based on the location and/or timing information associated with the received request. The determination module 207 retrieves 408 the stream of content from the user's profile in the storage device 243. In the instance where the user consents to the use of such data, the determination module 207 receives information from the feedback module 211 about the format that the user prefers for viewing posts, for example, the user prefers to see a headline and a snippet of content, half of an article or a full version of the post. The determination module 207 determines 410 a format for displaying the one or more posts and calculates 412 a viewing time for each post in the stream of content that was not previously viewed according to the feedback module 211. The determination module 207 then determines 414 one or more posts from the stream of content based on the topic, the available time, the time frame and the viewing time of each post in the retrieved stream of content. The determination module 207 instructs the user interface engine 209 to provide the one or more posts in the format preferred by the user. The user interface engine 209 generates 416 graphical data for providing the one or more posts to the user 125.

Figure 5A:
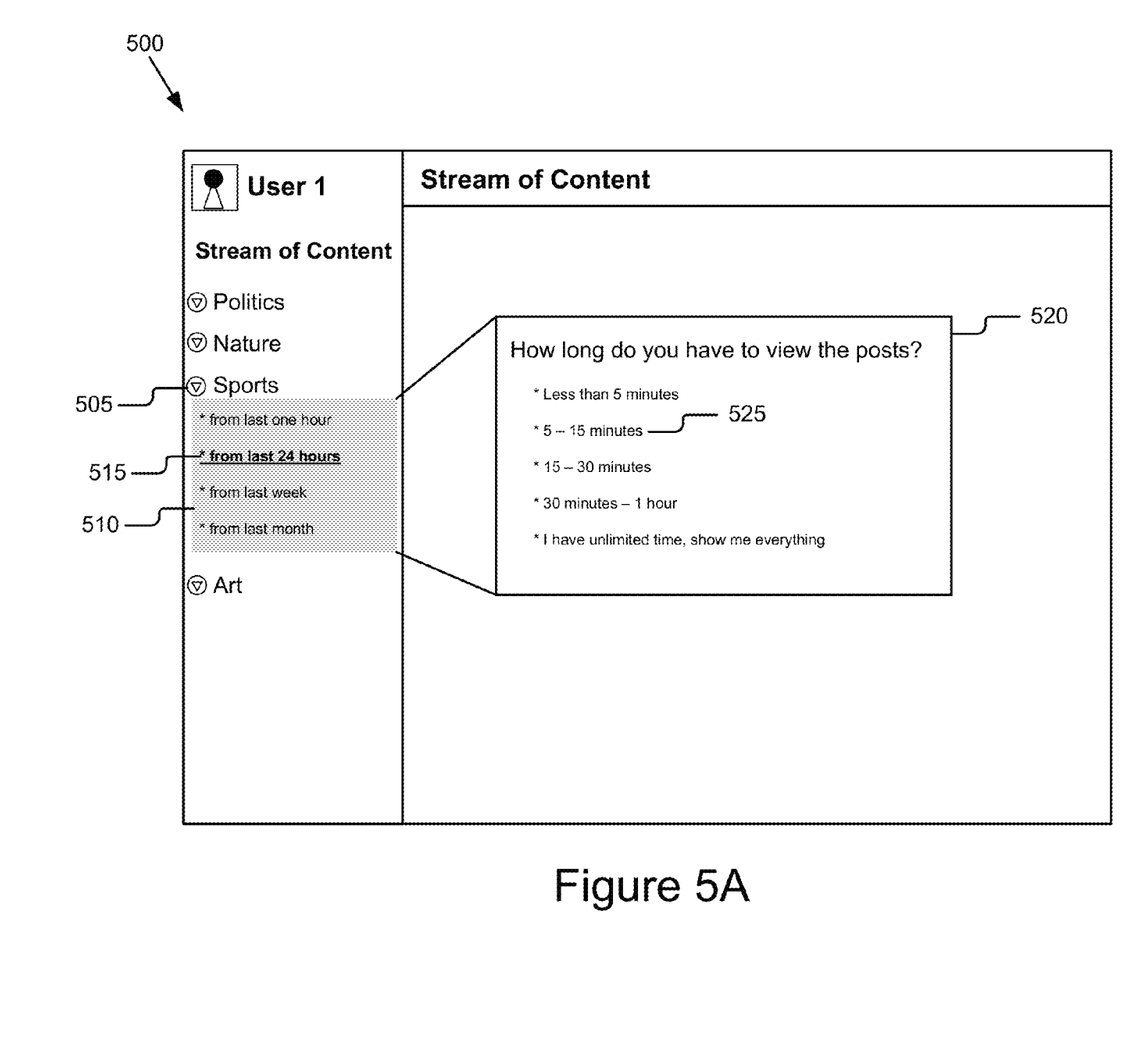
FIG. 5A is an example graphic representation of a user interface for requesting a stream of content.

Turning now to FIG. 5A, an example graphical representation of a user interface 500 for requesting a stream of content is illustrated. The user interface 500 displays different topics for streams of content that are subscribed to by User 1. In this example, User 1 submits a request for a stream of content related to sports by clicking on the button 505. In response to User 1 clicking on the button 505, the user interface displays a drop down menu 510 that includes a list of time frames. In this example, User 1 selects to receive posts that occurred within the last 24 hours by clicking on the link 515. In response to User 1 clicking the link 515, the user interface 500 displays a pop-up window 520 that includes a list of available times that User 1 can select. In this example, User 1 indicates that the time available for viewing the stream of content is 5-15 minutes by clicking the link 525.

Figure 5B:
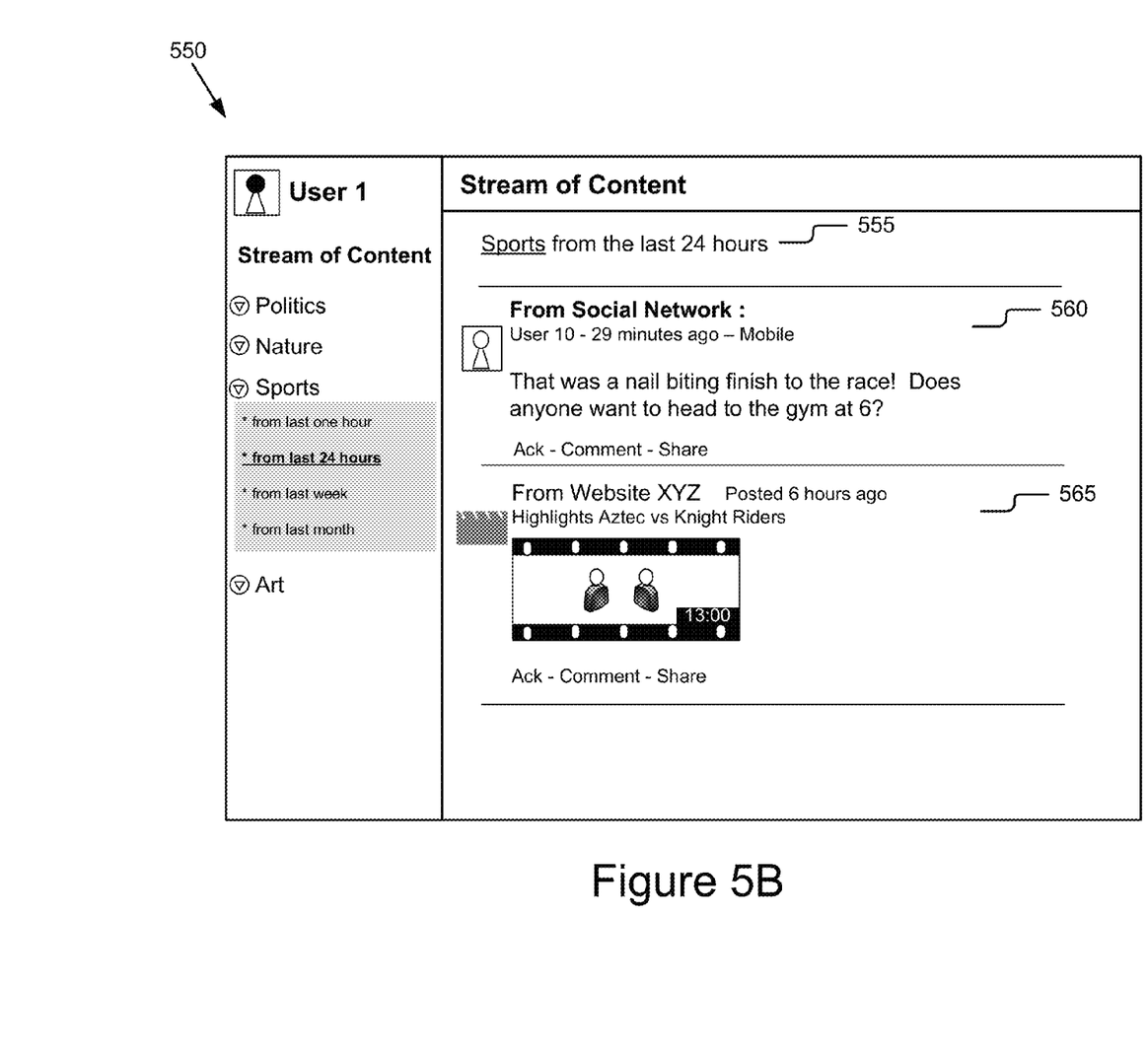
FIG. 5B is an example graphic representation of a user interface for providing a stream of content to a user.

Turning now to FIG. 5B, an example graphic representation of a user interface 550 for providing a stream of content to a user 125. In this example, the filter application 103 generates graphical data for providing the user interface 550 in response to User 1 submitting a request by clicking the link 525 (see FIG. 5A). The user interface 550 displays a stream of content related to sports 555 including posts that occurred within the last 24 hours. In this example, the request submitted by User 1 indicates the available time as 5-15 minutes. Thus, the determination module 207 includes a social network status update 560 that has a viewing time of one minute and a video 565 that has a viewing time of 13 minutes.

In the above description, for purposes of explanation, numerous specific details are set forth in order to provide a thorough understanding of the specification. The disclosure can be practiced without these specific details. In other instances, structures and devices are shown in block diagram form in order to avoid obscuring the description. For example, the present implementation is described in one instance below primarily with reference to user interfaces and particular hardware. However, the present implementation applies to any type of computing device that can receive data and commands, and any peripheral devices providing services.

Reference in the specification to "some instances" or "an instance" means that a particular feature, structure, or characteristic described in connection with the instance is included in at least some instances of the description. The appearances of the phrase "in some instances" in various places in the specification are not necessarily all referring to the same instance.

Some portions of the detailed descriptions above were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms, e.g., "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instance, an entirely software instance or an instance containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. The specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, with one or more processors, a request for a stream of content from a user;
   calculating, with the one or more processors, a viewing time for each post in the stream of content as an average time taken by the user to view or interact with a post;
   determining, with the one or more processors, an available time for the user;
   determining, with the one or more processors, one or more posts from the stream of content based on the viewing time for each post and the available time for the user, wherein determining the one or more posts includes computing a total viewing time for the one or more posts based on the viewing time for each of the one or more posts and determining that the total viewing time matches the available time for the user;
   determining a topic for the stream of content based on when the request for the stream of content is received;
   providing the topic for the stream and the one or more posts to the user;
   determining interactions of the user with the one or more posts;
   automatically determining a preferred format for the user based on the determined interactions with the topic and the one or more posts; and
   updating the viewing time for each post based on the preferred format.

2. The method of claim 1, further comprising:
   determining a behavior pattern of the user based on previously submitted requests; and
   determining the available time for the user based on the behavior pattern of the user.

3. The method of claim 2, further comprising determining the behavior pattern of the user based on timing information associated with the previously submitted requests.

4. The method of claim 2, further comprising determining the behavior pattern of the user based on location information associated with the previously submitted requests.

5. The method of claim 1, further comprising determining the one or more posts from the stream of content based on a list of posts previously viewed by the user.

6. The method of claim 1, further comprising:
   receiving a time frame for the stream of content from the user; and
   determining the one or more posts from the stream of content based on the time frame.

7. A system comprising:
a processor; and
a memory storing instructions that, when executed, causes the system to:
- receive a request for a stream of content from a user;
- calculate a viewing time for each post in the stream of content as an average time taken by the user to view or interact with a post;
- determine an available time for the user;
- determine one or more posts from the stream of content based on the viewing time for each post and the available time for the user, wherein determining the one or more posts includes computing a total viewing time for the one or more posts based on the viewing time for each of the one or more posts and determining that the total viewing time matches the available time for the user;
- determine a topic for the stream of content based on when the request for the stream of content is received;
- provide the topic for the stream and the one or more posts to the user;
- determine interactions of the user with the one or more posts;
- automatically determine a preferred format for the user based on the determined interactions with the topic and the one or more posts; and
- update the viewing time for each post based on the preferred format.

8. The system of claim 7, wherein the memory also stores instructions that, when executed, causes the system to:
- determine a behavior pattern of the user based on previously submitted requests; and
- determine the available time based on the behavior pattern of the user.

9. The system of claim 8, wherein the memory also stores instructions that, when executed, causes the system to determine the behavior pattern of the user based on timing information associated with the previously submitted requests.

10. The system of claim 8, wherein the memory also stores instructions that, when executed, causes the system to determine the behavior pattern of the user based on location information associated with the previously submitted requests.

11. The system of claim 7, wherein the memory also stores instructions that, when executed, causes the system to determine the one or more posts from the stream of content based on a list of posts previously viewed by the user.

12. The system of claim 7, wherein the memory also stores instructions that, when executed, causes the system to:
- receive a time frame for the stream of content from the user; and
- determine the one or more posts from the stream of content based on the time frame.

13. A computer program product comprising a non-transitory computer usable medium including a computer readable program, wherein the computer readable program when executed on a computer causes the computer to:
- receive a request for a stream of content from a user;
- calculate a viewing time for each post in the stream of content as an average time taken by the user to view or interact with a post;
- determine an available time for the user;
- determine one or more posts from the stream of content based on the viewing time for each post and the available time for the user, wherein determining the one or more posts includes computing a total viewing time for the one or more posts based on the viewing time for each of the one or more posts and determining that the total viewing time matches the available time for the user;
- determine a topic for the stream of content based on when the request for the stream of content is received;
- provide the topic for the stream and the one or more posts to the user;
- determine interactions of the user with the one or more posts;
- automatically determine a preferred format for the user based on the determined interactions with the topic and the one or more posts; and
- update the viewing time for each post based on the preferred format.

14. The computer program product of claim 13, wherein the computer readable program when executed on the computer causes the computer to also:
- determine a behavior pattern of the user based on previously submitted requests; and
- determine the available time based on the behavior pattern of the user.

15. The computer program product of claim 14, wherein the computer readable program when executed on the computer causes the computer to also determine the behavior pattern of the user based on timing information associated with the previously submitted requests.

16. The computer program product of claim 14, wherein the computer readable program when executed on the computer causes the computer to also determine the behavior pattern of the user based on location information associated with the previously submitted requests.

17. The computer program product of claim 13, wherein the computer readable program when executed on the computer causes the computer to also determine the one or more posts from the stream of content based on a list of posts previously viewed by the user.

18. The computer program product of claim 13, wherein the computer readable program when executed on the computer causes the computer to also:
- receive a time frame for the stream of content from the user; and
- determine the one or more posts from the stream of content based on the time frame.

* * * * *